3,323,651
LIQUID RESERVOIR TANKS, SUITABLY, FOR VEHICLES
Jack Hauxwell and Cyril W. Blacker, Ipswich, Suffolk, England, assignors to Ransomes Sims & Jefferies Limited
Filed May 15, 1963, Ser. No. 280,564
Claims priority, application Great Britain, June 26, 1962, 24,516/62
4 Claims. (Cl. 210—172)

This invention relates to liquid reservoir tanks, suitably, for vehicles. In a fork lift truck the source of hydraulic liquid for operating the rams controlling movements of the fork carriage on the mast and of the mast itself is a reservoir tank in which is disposed a filter connected to the suction outlet of the tank. In a known construction removal of the filter necessarily involves disconnection of the suction hose attached to the suction outlet of the tank before the filter can be withdrawn from an aperture in the top of the reservoir. It is an object of the present invention to provide a reservoir tank in which is disposed a filter which can be removed from the tank without having first to disconnect the suction hose.

According to the present invention a liquid reservoir tank, suitably, for a vehicle comprises a vessel formed in a top wall thereof with an aperture closed by a removable cover plate, a filter disposed within a lower part of the vessel, a union secured in liquid-tight manner to an upright side of the tank and having an inlet tubular portion within the tank and an outlet tubular portion projecting outside the tank for the connection thereto of a suction hose, a connection pipe engaging at a lower end thereof with the filter and at an upper end thereof in a sliding fit with the inlet portion of the union, and airtight sealing ring between the upper end of the connection pipe and the inlet portion of the union whereby the connection pipe can be removed from the union and removed together with the filter through the aperture in the top wall of the tank.

Suitably, the cover plate for closing the aperture in the top wall of the tank is formed with an abutment which, when the cover plate is disposed to cover the aperture projects within the tank and inhibits movement of the connection pipe relative to the inlet portion of the union in a direction to disconnect the pipe from the union.

Figure 1:
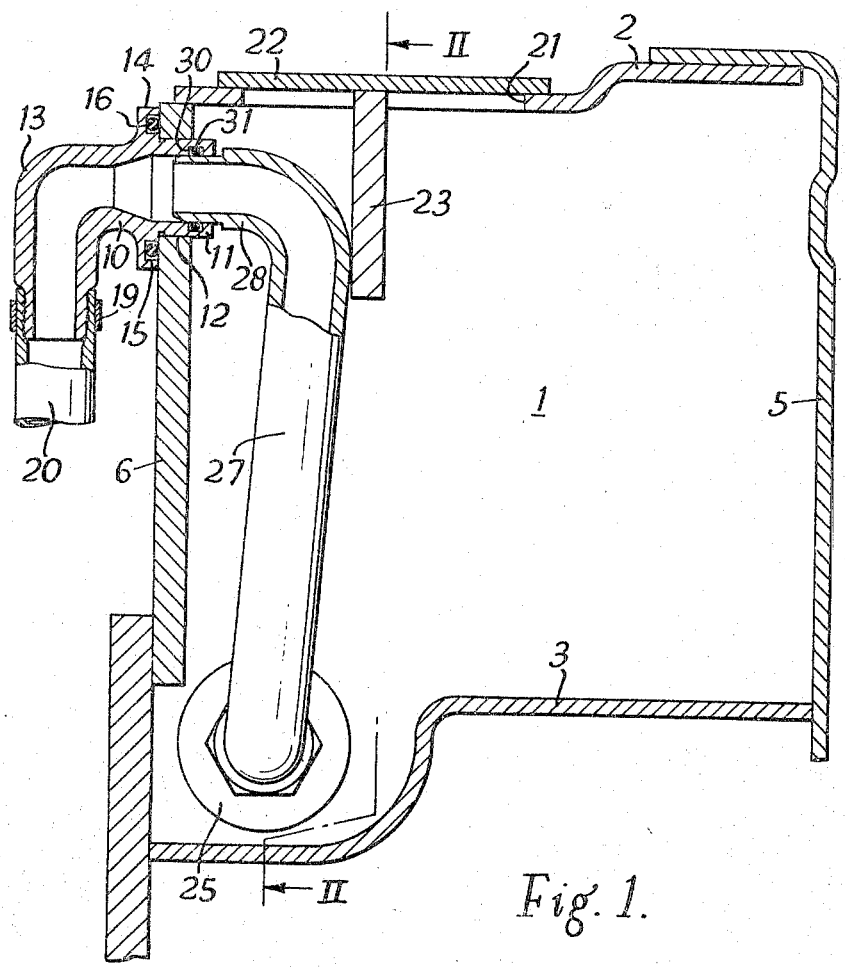
Figure 2:
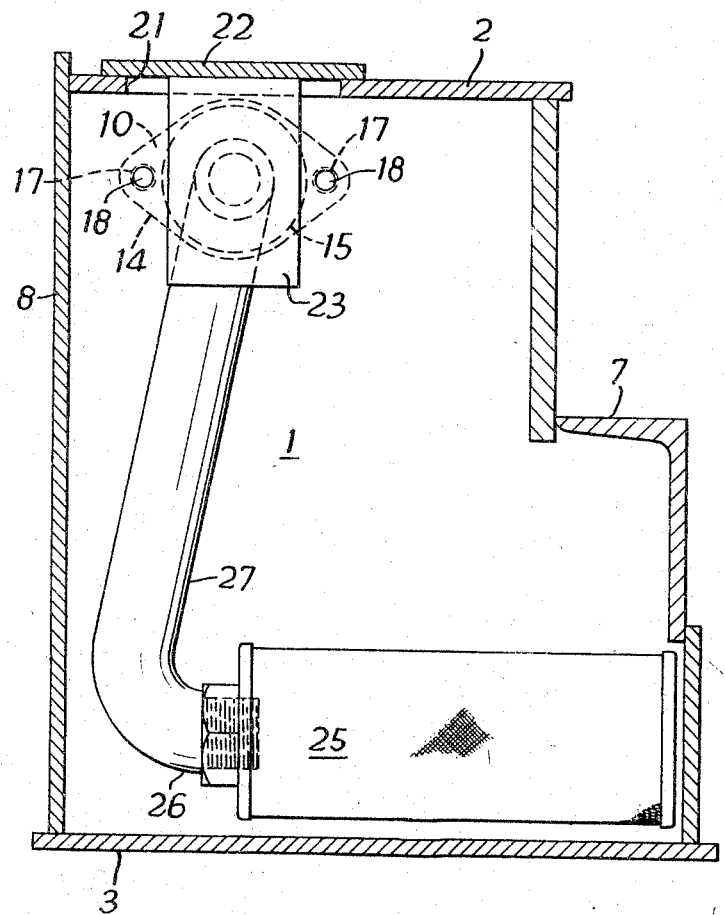

The invention will now be described, by way of example, with reference to the accompanying drawings, in which:

FIGURE 1 is a sectional side elevation of a liquid reservoir tank according to the invention, and FIGURE 2 is a sectional view on the line II—II of FIGURE 1.

Referring to the drawings an hydraulic liquid reservoir tank 1 of a fork lift truck is mounted on the chassis of the truck (not shown) and includes horizontal top and bottom walls 2 and 3 upright front and rear walls 5 and 6 and side walls 7 and 8. In upright rear wall 6 of the tank is mounted a union 10 comprising a tubular inlet portion 11 extending through a hole 12 in the tank wall 6 and within the tank and an outlet tubular portion 13 extending to the exterior of the tank. Between the inlet and outlet tubular portions of the union is a flange 14 which, at is inner face, abuts the outer face of the tank rear wall 6 and which is formed in its inner face with a circular groove 15 concentric with the inlet and outlet portions of the union 10. Within this circular groove is disposed a sealing ring 16. The flange may be secured to the rear wall 6 of the tank either by welding or, alternatively, as shown in FIGURE 2, may be formed outwardly of the groove with apertures 17 which fit over studs 18 welded to and projecting outwardly from the tank side wall, nuts (not shown) being provided to engage these studs at the side of the flange of the union opposite the sealing ring 16.

On the outlet tubular portion 13 of the union 10 is mounted, by means of a jubilee clip 19, a suction hose 20 leading to the inlet of an hydraulic pump.

In the top wall 2 of the tank is formed an aperture 21 on which is fitted a cover plate 22 removably secured as by bolts (not shown) to the top wall 2 of the tank. On the inner surface of the removable cover plate is welded a strip-like abutment 23 which extends within the tank and is disposed at a location facing and spaced from the inlet portion 11 of the union 10.

A cylindrically-shaped hydraulic liquid filter 25 of known edge-wound form is horizontally disposed adjacent the bottom wall 3 of the tank and is connected at one end thereof with a horizontally extending end part 26 of a connection pipe 27. From this horizontally extending end part 26, the connection pipe 27 runs upwardly and at its upper end is formed with a further horizontally extending part 28, this latter part extending in a direction at right angles to that of the part 26 to which the filter is attached. The upper horizonally extending end part 28 of the connection pipe engages within the inlet tubular portion 11 of the union. A short distance from the inlet end of the inlet tubular portion of the union is formed an annular groove 30 within which is disposed a sealing ring 31 for rendering air-tight the connection between the union and the connection pipe. The connection pipe 27 engages the inlet portion of the union in a sliding fit. The connection pipe 27 at the bend leading to the part 28 thereof, engages the strip-like abutment member 23 on the cover plate 22, thus preventing outward movement of the connection pipe from the union which would disconnect the connection pipe from the union.

It will be noted that the filter 25 is located in a downwardly recessed part of the bottom wall 3 of the tank and this assures optimum utilization of the fluid contents of the tank.

In order to remove the filter 25 from the tank the cover plate 22 is removed thereby removing the strip-like abutment 23 from contact with the connection pipe 27. The connection pipe 27 is then withdrawn from the inlet portion of the union whereupon the connection pipe and filter can be withdrawn through the aperture in the top wall of the tank. Therefore, it is unnecessary to disconnect the suction hose 20 from the union prior to withdrawal of the filter.

We claim:
1. In combination:
 (A) a liquid reservoir vessel having generally upright side walls and a top wall, and having an opening in its top wall adapted to be closed by a cover;
 (B) a filter disposed within a lower part of the vessel;
 (C) a union having a liquid tight securement to a side wall of the vessel at a location spaced above the bottom thereof and having a tubular inlet end portion opening to the interior of the vessel and a tubular outlet portion projecting outside the vessel for the connection thereto of a duct;
 (D) a connection pipe having a lower end portion connected with the filter;
 (E) cooperating means on the inlet end portion of the union and on the upper end portion of the connection pipe providing a readily disengageable telescoping sealed connection between them which can be engaged and disengaged by manipulation of the connection pipe through said opening in the top wall;
 (F) means on the connection pipe providing an abutment which faces away from the inlet end portion of the union; and

(G) a cover for the vessel releasably secureable in a position closing said opening, said cover having means thereon projecting downwardly into the vessel and normally opposingly engaging said abutment means on the connection pipe to normally maintain said telescoping connection engaged.

2. In combination:
(A) a liquid reservoir vessel having side walls and a top wall, said top wall having an access hole therein and one side wall having a smaller hole therethrough which is spaced above its bottom;
(B) a tubular union secured to said one side wall of the vessel and having
   (1) an inlet end portion in register with said smaller hole opening to the interior of the vessel and sealed to said side wall around the marginal edge portion of said smaller hole, and
   (2) an outlet end portion at the exterior of the vessel connectable with a duct;
(C) a liquid filter adapted to be disposed within the lower portion of the vessel and small enough to pass through said access hole;
(D) a connection pipe
   (1) having an elongated generally upright medial portion,
   (2) having its lower end connected with the filter, and
   (3) having a generally horizontally extending upper end portion;
(E) cooperating means on the inlet end portion of the union and on said upper end portion of the connection pipe providing a readily disengageable telescoping sealed connection between them engageable and disengageable upon generally horizontal translatory motion of the connection pipe relative to the union, the connection pipe being accessible for such manipulation through the access hole; and
(F) abutment defining means releasably supported by the vessel in a normal position within the vessel at which said abutment means engages the connection pipe at a location spaced above the lower end thereof and at the side thereof remote from said one side wall to prevent movement of the connection pipe out of engagement with the union.

3. The combination of claim 2 further characterized by:
(A) a cover removably securable on the top wall of the vessel to close said access hole; and
(B) said abutment defining means comprising a downward projection on said cover.

4. The combination of claim 2, further characterized by:
said cooperating sealed connection means comprising a resilient ring confined under radial compression between the telescoped upper end portion of the connection pipe and inlet end portion of the union.

References Cited
UNITED STATES PATENTS

| | | | |
|---|---|---|---|
| 1,659,094 | 2/1928 | Godfrey | 285—158 X |
| 2,013,660 | 9/1935 | Lauer | 285—158 X |
| 2,877,903 | 3/1959 | Veres | 210—172 X |
| 3,149,861 | 9/1964 | Larsson | 285—349 |

FOREIGN PATENTS

| | | |
|---|---|---|
| 244 | 1/1890 | Great Britain. |
| 596,201 | 12/1947 | Great Britain. |

REUBEN FRIEDMAN, *Primary Examiner.*

F. W. MEDLEY, *Assistant Examiner.*